Dec. 2, 1969  W. J. WILLIAMS  3,481,252
VEHICLE BRAKE ACTUATOR
Original Filed April 26, 1966  3 Sheets-Sheet
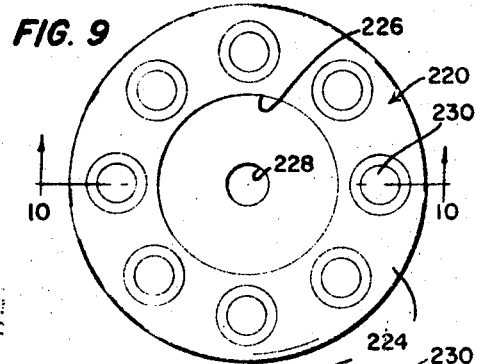
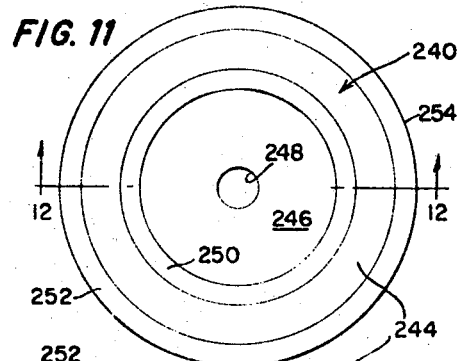
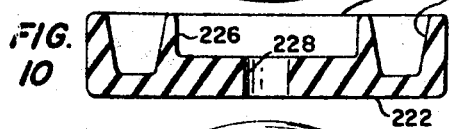
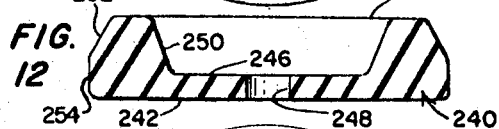
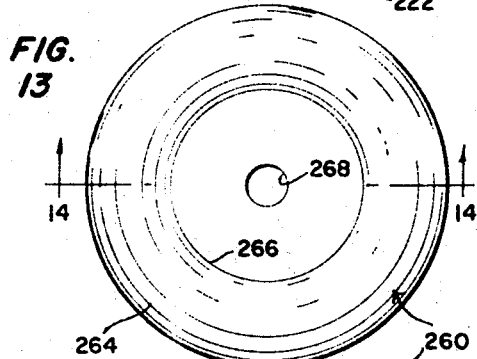
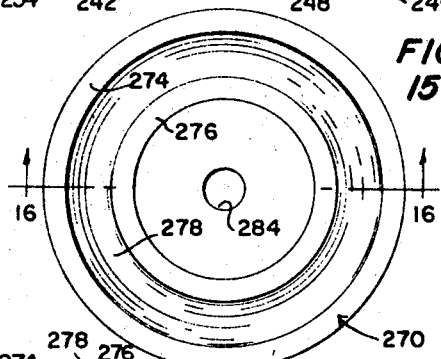
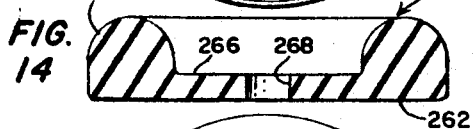
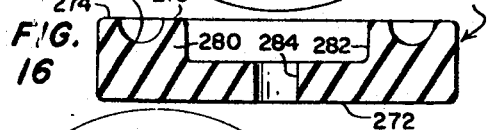
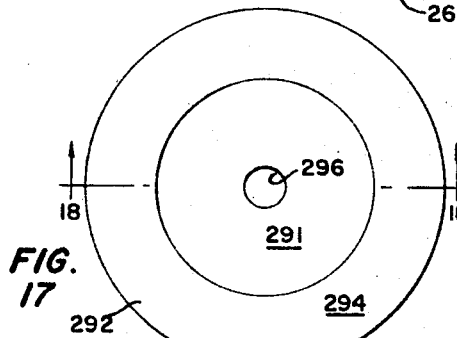
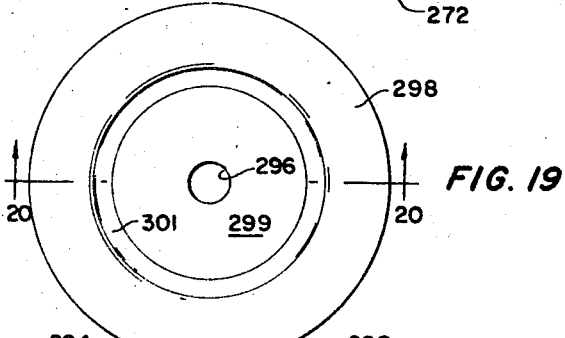
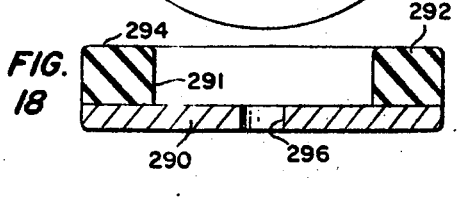
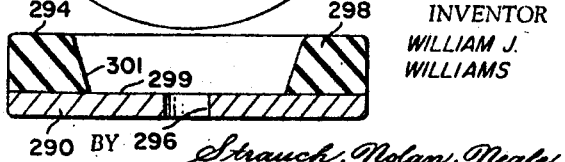
INVENTOR
WILLIAM J. WILLIAMS
BY Strauch, Nolan, Neale, Nies & Bronaugh
ATTORNEYS

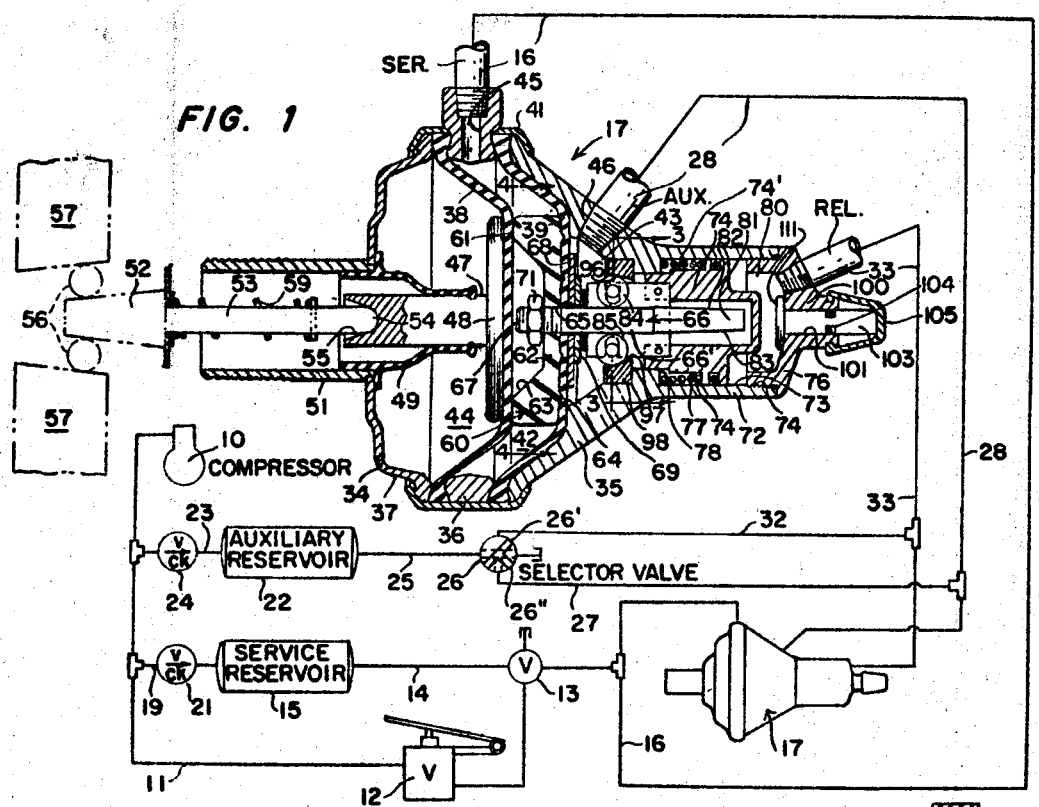

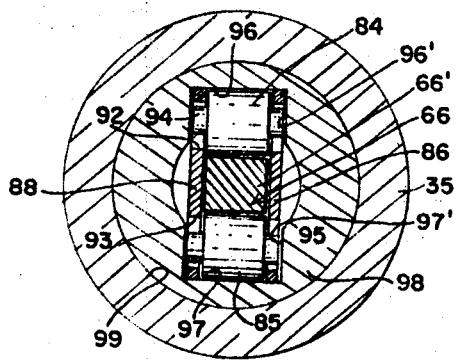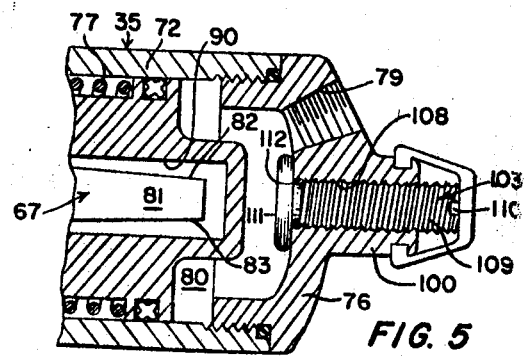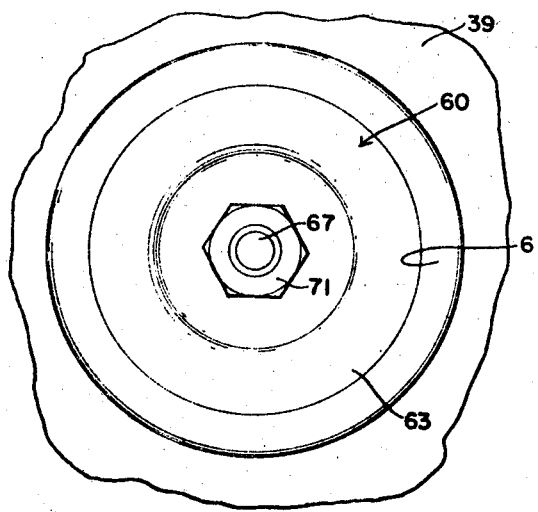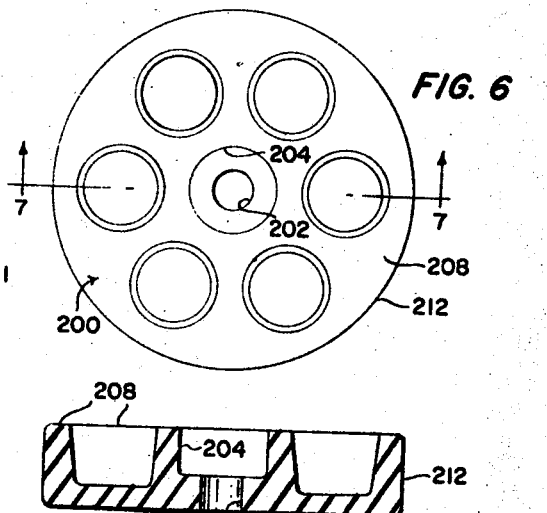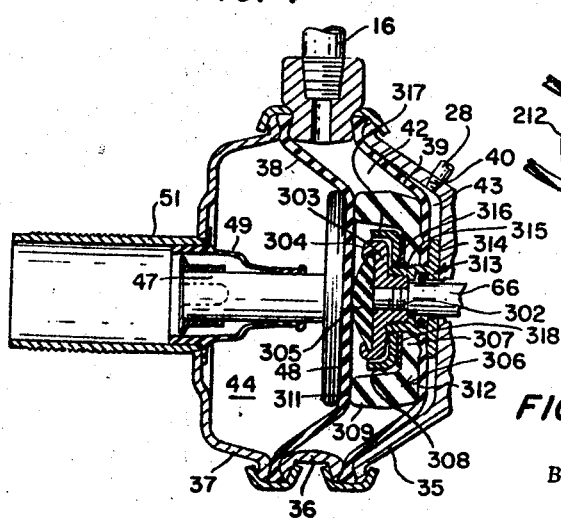

United States Patent Office 3,481,252
Patented Dec. 2, 1969

3,481,252
VEHICLE BRAKE ACTUATOR
William J. Williams, Ashtabula, Ohio, assignor, by mesne assignments, to Rockwell-Standard Company, Pittsburgh, Pa., a corporation of Delaware
Continuation of application Ser. No. 545,468, Apr. 26, 1966. This application Sept. 13, 1968, Ser. No. 760,130
Int. Cl. F15b *15/10;* F16d *65/32*
U.S. Cl. 92—27                                           16 Claims

ABSTRACT OF THE DISCLOSURE

A vehicle brake actuator assembly comprises a housing wherein two spaced flexible diaphragms are disposed in tandem with a service fluid pressure chamber between them and an auxiliary fluid pressure chamber between a first diaphragm and the housing, an axially rigid connection between the second diaphragm and a wedge type actuator disposed between opposed brake shoe ends, said diaphragms being independently displaceable in the same direction for applying the brake, mechanical locking means automatically responsive to a brake application resulting from introduction of auxiliary fluid pressure into said auxiliary fluid pressure chamber and directly effective on the first diaphragm for preventing return movement of both diaphragms to brake releasing position, and an axially yieldable spacer and force transmitting member mounted on one of the diaphragms and extending between the diaphragms, such spacer member being sufficiently rigid to transmit brake applying forces to said brake applying means but being deformable when subjected to a compressive stress exceeding a predetermined amount.

---

This application is a continuation of application Ser. No. 545,468 filed April 26, 1966, now abandoned.

The present application relates to vehicle brake actuators and particularly to locking arrangements for emergency and parking. The invention constitutes an improvement over that disclosed in co-pending application Ser. No. 465,893, filed June 22, 1965, by James C. Cumming.

The invention embodies an improvement which, particularly when incorporated in a brake actuator of the type disclosed in said co-pending application, further increases the effectiveness and safety factor of the brake system and renders it more controllable by the vehicle operator without undue effort, particularly upon release of the brake after use as a parking brake under certain conditions or during emergency use of the brake by action of auxiliary air pressure.

The brake actuator disclosed in the said co-pending application includes a locking means for maintaining the actuator in brake applied position after being energized by auxiliary air pressure, either during an emergency or when operated as a parking brake. In order to release that actuator, air pressure must be introduced into a release chamber, or a manual plunger operated, in order to unlock the locking means. The brake actuator comprises two diaphragms in tandem within a housing with a motion transmitting spacer member between them. This spacer member is attached directly to a diaphragm and a component part of the locking means on one side, and is operatively solidly connected in motion transmitting association with part of the brake actuator on the other side.

During emergency braking, or when the actuator is used for applying the brake in a parking brake mode, this spacer member is under compression due to opposed forces developed by the brake locking means and by the reaction from the brake mechanism. When the brake actuator is energized in a parking brake mode, for example, in the event that the parking brake actuation follows a substantially long period during which the service brakes have been almost constantly applied, as for instance would be the case during a prolonged descent on a mountainous highway, because the brake wheel drums have considerably expanded due to the heat generated by prolonged friction between the brake lining and the drum surface, a considerably longer stroke of the actuator is required for positively locking the vehicle roadwheels at the time. Consequently, upon contraction of the now cooling brake drum, the wheel brake mechanism tends to increase the pressure applied upon one side of the spacer member, which is prevented from being displaced under the action of the force resulting from that pressure by the positively engaged locking means operatively connected to the other side of the spacer member. Abnormal stresses are thus imposed upon the internal structure of the brake actuator that may result in uncontrolled forces leading to failure of some of the elements or brake parts, such as the drum. Release of the brake is often impossible under such conditions because the release fluid pressure may be insufficient to overcome the static load applied upon the locking mechanism by the force resulting from the contraction of the drum.

In the event that this type of brake actuator is utilized as a temporary service brake actuator for the moving vehicle by introduction of air from the auxiliary air reservoir to the auxiliary air chamber in the actuator, there is always present a potential danger that, under some circumstances causing a sudden cooling of an overheated wheel drum, that the vehicle operator could face a wheel lock situation resulting from the seized spacer member, particularly if there is insufficient air pressure in the brake system reservoir for effecting the release of the locked actuator.

Such inconveniences and disadvantages as enumerated above are effectively eliminated in the invention by incorporating into a brake actuator a special spacer member which will not transmit excessive compression stress, as disclosed for the preferred embodiment of the present invention.

Consequently, it is a primary object of the present invention to provide for a novel fluid actuated emergency and parking brake positive mechanical locking means which is reliably capable of engagement, release and modulation through manually operable controls in the vehicle.

Still a further object of the invention is to provide an auxiliary emergency and parking brake locking means which is capable of engagement, release and re-use an indefinite number of times, this capability being independent of vehicle movement, and which includes special means for preventing internal damage to the actuator as a result of certain operational conditions of the braking system.

A further object of the invention is to provide a novel multiple chamber brake actuator having a deformable resilient or like stress absorbing spacer member between two internal tandem acting diaphragms.

A further object of the invention is to provide a novel arrangement for preventing undesirable wheel lock-up condition in a vehicle, such as resulting from cooling brake drum contraction, in a multiple chamber actuator having a pressure responsive service brake operating element operatively connected to a service brake mechanism and another pressure responsive element adapted to be independently operated for auxiliary actuation of said service brake mechanism, wherein brake applying operation of said other element is under operator control and the service brake mechanism is locked in applied condition after actuation by said other element. Pursuant to this object the invention also contemplates a reliable quick release of the locked brake mechanism, either by air pressure or manually.

Further objects of the invention will become apparent when the following description is considered in connection with the appended claims and the annexed drawings wherein:

FIGURE 1 is a longitudinal sectional view through a brake actuator according to a preferred embodiment of the invention and diagrammatically showing it incorporated in a vehicle service and auxiliary brake system, and with its output connected to a representative of brake applying operator, the parts being shown in brake disengaged position;

FIGURE 1A is a section showing a resilient metal spacer;

FIGURE 2 is a longitudinal section view of the brake actuator, similar to FIGURE 1 but showing the parts in brake applied position under control of the auxiliary operator;

FIGURE 3 is a cross-sectional view approximately on line 3—3 on FIGURE 1;

FIGURE 4 is a section approximately on line 4—4 in FIGURE 1 showing the spacer;

FIGURE 5 is a fragmentary longitudinal section of an embodiment similar to FIGURES 1-3 but including a different type of manual release;

FIGURES 6 and 7 are respectively a plan view and a section along line 7—7 of FIGURE 6 of another form of the spacer member;

FIGURE 8 is a fragmentary view partly in section showing the spacer member of FIGURE 7 in position in the brake actuator subjected to opposite forces tending to compress it during auxiliary or parking brake application;

FIGURES 9–20 show pairs of plan and sectional views respectively of other forms of spacer members according to the invention; and FIGURE 21 is a sectional view that shows a still further spacer arrangement in the assembly.

FIGURE 1 illustrates a system embodying the invention in a roadway vehicle having a transverse axle supported at opposite ends by ground engaging wheels. A compressor 10 is driven by the vehicle engine to provide air under pressure and is connected by a supply conduit 11 to an operator controlled foot pedal valve 12 which in turn is connected to a relay valve 13 disposed in a service conduit 14 that extends from a service air pressure reservoir 15 to a cross conduit 16 extending between the service air chambers of the brake actuator units 17 mounted at the opposite ends of the transverse axle (not shown).

Service reservoir 15 is maintained to serve as a source of air under constant pressure, being connected to supply conduit 11 by a conduit 19 containing a check valve 21 that prevents escape of pressure from reservoir 15 to conduit 11 when the compressor is not being driven.

The system also includes an auxiliary reservoir 22 supplied with air under pressure from the compressor supply line 11 through conduit 23 and a check valve 24 which prevents escape of pressure from reservoir 22 to line 11. The outlet of reservoir 22 is connected by conduit 25 to a normally closed selector valve 26. Valve 26 which is shown closed in FIGURE 1 has intersecting ports 26' and 26". When valve 26 is shifted to connect one end of port 26' to conduit 25, by rotation of the valve element clockwise in FIGURE 1, the auxiliary reservoir is connected to auxiliary air conduit 27 which in turn is connected to a cross conduit 28 extending between the auxiliary air chambers of actuators 17 as will appear. The dotted line position of valve 26 in FIGURE 1 shows this condition for auxiliary air actuation.

When selector valve 26 is turned to connect the other end of port 26' to conduit 25, a release air conduit 32 is thereby connected to the auxiliary reservoir, and conduit 32 in turn is connected by spur conduits 33 to the release air chambers of actuator 17, as will appear.

When valve 26 is in its closed position, conduit 25 is blocked, and conduits 27 and 32 are vented to atmosphere.

While the system shown in FIGURE 1 illustrates only two actuators 17, one for each wheel brake, it will be understood that the invention may be applied to any number of axles and wheel brakes by suitable connecting actuators 17 therefor to respective service, auxiliary and release air conduits.

FIGURE 1 shows one of the brake actuators enlarged and as comprising a main housing member 35, an annular intermediate housing member 36 and a housing end member 37. A service diaphragm 38 of the usual flexible type has its periphery clamped fluid tight between the housing end and intermediate members. A flexible auxiliary diaphragm 39 has its periphery clamped fluid tight between the intermediate and main housing members. Preferably the three housing members and the diaphragm peripheries are clenched in tight assembly by a sheet metal clamp ring 41.

Diaphragms 38 and 39 define between them a service air chamber 42, and an auxiliary air chamber 43 is defined within the main housing member at the right of diaphragm 39. The housing end chamber 44 to the left of diaphragm 38 is normally open to atmosphere by means such as a port 34.

The service air conduit 16 is connected through opening 45 in housing member 36 into service air chamber 42, and auxiliary air conduit 28 is connected through opening 46 in the main housing member 35 into the auxiliary air chamber 43.

Housing end chamber 44 contains an actuator rod 47 formed at its inner end with a rigid circular abutment plate 48 engaging service diaphragm 38. Rod 47 is supported in an axially flexible boot 49 secured at its outer end to a housing mounting tube 51 projecting from housing end member 37. An actuator wedge 52 is carried by a stem 53 with its rounded end 54 socketed in a depression 55 in the end of rod 47. Wedge 52, when displaced to the left as shown in FIGURE 1 to the position indicated in FIGURE 2, acts through rollers 56 to oppositely displace brake shoe connected plungers 57. This wedge, roller and plunger arrangement is preferably that shown in U.S. Letters Patent No. 3,037,504 to which reference is made for further detail.

A spring 59 diagrammatically shown in FIGURE 1 represents biasing spring means urging the service diaphragm 38 to the illustrated brake released position and may comprise the usual brake shoe return spring alone or an auxiliary light spring in the actuator 17.

A flexibly deformable spacer member 60 is disposed in service chamber 42 and is provided with a projecting annular end rim portion 61 in separable abutment with the inner side of service diaphragm 38. The annular projecting end portion 61 is thicker than and formed integrally with the reduced thickness recessed body portion 62 of the annular portion and the relatively flat bottom surface of the recessed body portion. The end of the spacer member 60 opposite annular projection 61 is substantially flat and circular, and it may be provided with annular ridges such as at 64 that press into the softer material of the auxiliary diaphragm 39 so as to increase the seal between service air chamber 42 and auxiliary air chamber 43.

Spacer member 60 is centrally secured to auxiliary diaphragm 39 and is provided with an axial aperture 65. A wedge rod 66, having a body 66' generally square or rectangular in cross-section, has a threaded end 67 extending through a member 60, a clamp plate 68 and a spacer washer 69 abutting against an axially fixed shoulder 70 on the body portion of the wedge rod. A nut 71 on rod end 67 is drawn tight against the spacer member 60 to secure spacer member 60, diaphragm 39, plate 68 and wedge rod 66 in axially tight assembly.

The diameter of annular projection 61 is preferably about equal to that of the actuator rod abutment plate 48, for stable wide distribution of the axial forces during operation.

Beyond the auxiliary air chamber 43, the main housing member 35 is reduced to a neck section 72 defining a cylinder 73 in which is slidably mounted a stepped diameter piston 74. The open end of cylinder 73 is threaded at 75 to receive a closure member 76 which serves as an end abutment for piston 74 as the piston is biased to the right by a compression spring 77 seated on internal shoulder 78 of cylinder 73 and disposed around the reduced diameter portion 74' of piston 74. The release air conduit 33 is connected through an aperture 79 in closure member 76 to a release air chamber 80 formed between closure member 76 and the end of piston 74.

Wedge rod 66 has its opposite sides in rolling contact with opposed rollers 84 and 85 mounted in a cage 86 secured to piston 74 as by pins 87.

The cage 86, as shown in FIGURES 1 and 3, preferably comprises a pair of spaced apart side plates 88 and 89 and piston 74, which latter is formed with a deep recess 90 of sufficient axial extent to accommodate the end of wedge rod 66 in its extreme right hand position shown in FIGURE 1 and has the side wall of its recess 90 slotted diametrically at 91 to receive the ends of the plates 88 and 89 of the cage to anchor the plates to piston 74 by means of the pins 87. Thus cage 86 extends within recess 90 to provide an axially compact assembly with piston 74, and the wedge rod may pass freely between the plates 88 and 89. In the FIGURE 1 released condition, rollers 84 and 85 engage the parallel-sided body of the wedge rod, and in the FIGURE 2 locked condition they engage the opposite inclined sides 82 and 83 of the wedge 81 integral with rod 66.

Plate members 88 and 89 are formed near the open end of the cage, i.e. at the left in FIGURE 1, with opposite open transverse slots 92 and 93 loosely rotatably and slidably receiving arbors 94 and 95 of rollers 84 and 85 respectively for floatingly mounting the rollers between the wedge rod and coacting longitudinally extending inclined ramp surfaces 96 and 97 on an axially fixed ramp member 98 that is secured within a shouldered internal section 99 of housing member 35. Ramp surfaces 96 and 97 are formed in the bottoms of diametrically opposed longitudinal slots 96' and 97' in the ramp member 98, as shown in FIGURE 3. Rollers 84 and 85 are thus mounted for rotation on the cage 86 and are free to float laterally in slots 92 and 93 between the wedge and plungers during displacement of wedge 52 as will appear.

The axes of rollers 84 and 85 lie in a plane that is perpendicular to the axis of longitudinal movement of wedge rod 66. Wedge surfaces 82 and 83 are oppositely inclined at the same angle to the longitudinal axis of wedge rod 66, and wedge rod 66 is prevented from turning in the assembly. Preferably each wedge surface forms with the corresponding inclined ramp surface an angle within the range of about 8–13 degrees, the selected angle being dependent upon the friction between these surfaces and the rollers, and the relative flexibility of the elements comprising the components. Ramp surfaces 96 and 97 are oppositely inclined in the same direction as the wedge surfaces. Ramp surfaces 96 and 97 are inclined at the same angle, and this angle is slightly steeper than the wedge surface angle with respect to the longitudinal axis of wedge rod 66, so that in all relative longitudinal locking positions of wedge 81 and the ramp the diameters of rollers 84 and 85 are slightly greater than the distance between surfaces 82 and 96, and surfaces 83 and 97, respectively. Consequently, in the FIGURE 2 condition, wedge rod 66 may be longitudinally displaced relative to piston 74 to the left in FIGURES 1 and 2, but it is wedge-locked against movement in the opposite direction.

Closure member 76 threaded onto the neck section 72 of housing 35 is provided with an integral extension 100 having a centrally arranged bore 101 in which is freely slidably disposed a plunger 103 having an O-ring seal 104 with the inner diameter surface of bore 101. The projecting end of the plunger 103 is normally protected by a clip-like cover cap 105 having a turned-in wedge 106 adapted to engage an appropriate groove 107 formed on the end of the extension 100 of closure member 76. This arrangement provides, in addition to the operator controlled air release hereinafter explained, a manually operable release that may be effected by striking the projecting plunger from outside a hammer blow to cause the head 111 of the plunger to engage the end of piston 74 for one-shot manual release of the locked brake actuator.

FIGURE 5 shows a modification of the above described manually operable release wherein the extension 100 of the closure member 76 is provided with a threaded internal bore 108. The plunger 103 has a threaded body portion 109 rotatable in bore 108 and a driving end recess 110 in which a tool may be engaged for turning the plunger until its head 111 engages the end of piston 74 for manual release of the brake actuator. A seal 112 insures against leakage of fluid from release chamber 80 during normal operation.

ASSEMBLY

The apparatus is initially assembled with the parts, particularly diaphragm 39, wedge rod 66 and piston 74, in the relationship shown in FIGURE 1. In assembly the ramp 98 is installed by press fit within shoulder 99. Spring 77 is placed around the reduced diameter portion 74' of piston 74, and the side plates 88 and 89 of cage 86 are inserted into the piston recess slots 91 and pins 87 driven in place.

The subassembly of piston 74, spring 77 and cage 86, with the rollers 84 and 85 in position, is introduced through the open reduced diameter portion 72 of housing member 35, the ramp slots 96' and 97' being deep enough to permit the rollers to displace toward each other in the cage slots 92 and 93 sufficiently to pass through the smaller open end of ramp 98. Cap 76 is now attached to close the end of the housing reduced diameter portion 72, and fluid pressure is introduced through openings 77, or plunger 103 is manually displaced toward the left, to in turn displace piston 74 to the left in FIGURE 1 until the rollers are located at the widest portion of the ramp to the position shown in FIGURE 1 with spring 77 compressed between housing shoulder 78 and piston 74. With this condition maintained, the subassembly comprising wedge rod 66 with its threaded end 67 already secured to diaphragm 39, spacer member 60, plate 68 and washer 69 is introduced into housing 35, the wedge end 81 being thrust between rollers 84 and 85 and pushed to the right until the parts are located as in FIGURE 1.

The pressure is removed from the right end of piston 74 by exhausting the fluid in chamber 80 or by displacing plunger 103 to the right. Spring 77 expands and tends to displace piston 74 to the right, but due to the interference fit of the rollers with the wedge body and the inclined ramp surfaces shown in FIGURE 1 the spring action forces these parts into locking relationship to prevent relative movement between wedge rod 66 and piston 74 and to hold these parts in the relationship shown in FIGURE 1. Diaphragms 38 and 39 are then attached to the housing parts, the clenching ring 41 secured in place, and the assembly completed.

OPERATION

During normal conditions the vehicle brakes are operated like any other pneumatic brakes, the operator treading on pedal 12 to operate relay valve 13, in the system illustrated in FIGURE 1, for passing air under pressure from service reservoir 15 through service conduit 14 and branch conduit 16 to the service chamber 42 of each brake actuator 17. When the operator takes his foot off the pedal to release the brakes, air from the service chambers of the actuators 17 is quickly exhausted to atmosphere through appropriate porting of relay valve 13 to exhaust.

FIGURE 1 shows the parts in the brake released condition wherein there is no air pressure in any of chambers 42, 43 or 80 and the brake shoe return or other biasing spring 59 urges both actuator diaphragms to the right.

When air under pressure enters service chamber 42, diaphragm 38 is displaced to the left away from spacer member 60 and acts through wedge 52 to oppositely displace plungers 57 to apply the service brake shoes, not shown. During this time diaphragm 39 remains substantially in its right hand position of FIGURE 2, being urged strongly in that direction by the air pressure in service chamber 42. Piston 74 therefore remains substantially stationary.

During this normal service air actuation the auxiliary system remains inoperative, valve 26 being closed.

Should the service air system fail, as by a break in service conduit 14, the vehicle operator immediately recognizes the condition because of failure of the brake to respond to normal pedal operation, or possibly as a result of the activation of a suitable visual signal and/or audible alarm in the cab. The operator may now selectively apply the service brakes by turning valve 26 to the dotted line position of FIGURE 1. This brings into effect the independent auxiliary air system from reservoir 22 which supplies air under pressure through conduits 25, 27 and 28 into auxiliary air chamber 43 of each actuator 17, and results in the parts being displaced immediately to the relationship shown in FIGURE 2.

When air under pressure occupies chamber 43, diaphragm 39 is displaced to the left in FIGURE 2 so that spacer member 60 which solidly abuts diaphragm 38 shifts diaphragm 38, plate 48, rods 47 and 53 and wedge 52 in the brake applying direction just as in service air operation. Wedge rod 66 is carried with diaphragm 39 and moves to the left relative to cage 86, as permitted by the unidirectional locking action of rollers 84 and 85.

During this auxiliary operation, air under pressure in chamber 43 also acts upon piston 74 to move it to the right in FIGURE 2 toward, but never into contact with the end 111 of plunger 103 in closure 76. This action is aided and smoothed by the expansion of spring 77. The roller assembly attached to piston 74 by the cage 86 moves to the right with the piston.

As wedge rod 66 and the cage 86 are thus oppositely displaced, roller 84 and 85 roll along the ramp surfaces 96 and 97 and the sides of the wedge rod, so that the unlocking action is accomplished with minimal frictional resistance and without binding. The movements of the wedge rod and of the cage and roller assembly, though both dependent upon air pressure within auxiliary chamber 43, are relatively independent of each other, that is, the wedge rod movement is dependent upon the displacement of diaphragm 39 to the left whereas the cage and roller assembly movement is dependent upon the displacement of piston 74 to the right.

When the parts are in the locking association shown in FIGURE 2, rollers 84 and 85 are in contact with the oppositely inclined wedge surfaces 82 and 83 and the associated ramp surfaces 96 and 97, and during all relative movements of the wedge rod in one direction and the cage and roller assembly in the other direction during this locking interval the rollers 84 and 85 remain in rolling sliding contact with the wedge and ramp surfaces. Spring 77 functions to assure continual roller contact with the wedge surfaces in such readiness as to prevent uncontrolled relative return movement between the wedge rod and the piston at any time.

FIGURE 2 shows the locking means engaged when the diaphragms 38 and 39 and the piston 74 have been fully displaced within the limits of the auxiliary chamber 43, now fully expanded, and there exists an actual interference line fit of the rollers 84 and 85 against ramp surfaces 96 and 97 and against wedge surfaces 82 and 83. This interference fit locking action is not to be confused with providing a locking means through the use of frictional resistance. The outside diameter of the rollers 84 and 85 is purposely slightly larger than the spatial distance between the relatively sloping wedge and ramp surfaces immediately to the right of the rollers at any given longitudinal position of engagement, regardless of where the rollers are positioned along the ramp. Thus it is possible, once the wedge rod has been displaced sufficintly to dispose wedge 81 between the rollers to effect an auxiliary brake lock at any point along the surface of the ramp guide slots, a feature which, as will be subsequently explained, makes possible operator controlled modulation of the brake. In practice it is anticipated that such factors as age of the diaphragms, wear of the brake lining, internal temperature of the unit, routine wear and tear of the unit components, capability of operator to modulate air pressure into the auxiliary chamber, among others, will preclude maximum amount, or repetitively the same relative amount of piston and diaphragm displacement each time the auxiliary brake is actuated.

Should fluid pressure escape from chamber 43 with the brake locked as shown in FIGURE 2, the established interference fit at the lock prevents movement of the wedge rod 66 to the right, and movement of the roller and cage assembly to the left is at the same time resisted and prevented by the action of spring 77. Thus, once engaged, the locking means becomes independent of the pressure setting within the auxiliary chamber 43 or its subsequent loss. It can be broken only through the introduction of additional fluid under pressure to further move the diaphragm 39 and wedge rod 66 to the left and to further displace piston 74 and the caged rollers to the right along the ramp, should their initial displacement be less than maximum to increase the braking force, or by the introduction of air under sufficient pressure into release chamber 80 to intentionally release the braking force.

To release the brake locking means once so engaged requires the introduction of fluid under pressure into release chamber 80, simultaneously with venting the auxiliary chamber 43 through port 46. The fluid entering release chamber 80 acts upon piston 74 to move the piston and the cage and roller assembly attached thereto to the left, compressing spring 77. Simultaneously with this piston and cage roller assembly movement, diaphragm 39 with the attached wedge rod 66 flexes back toward its relaxed FIGURE 1 position as the auxiliary chamber 43 is vented, and the assembly once again assumes the "unlocked" position shown in FIGURE 1.

The foregoing operation is generally the same as disclosed in said Serial No. 465,893, but the present stress absorbing arrangement provided by resilient member 60 between the diaphragms provides a markedly more reliable system overall.

Referring to the locked condition of FIGURE 2, it is seen that spacer member 60, disposed in service chamber 42 between diaphragm 38 and diaphragm 39 and attached to diaphragm 39 and the wedge rod 66, is subjected to a compression stress caused by the force, represented by arrow 120, resulting from the reaction of the brake shoes applied upon the brake drum during brake application by way of the auxiliary brake control and the force, directed in an opposite direction and arbitrarily represented by arrow 122, resulting from the locking action of the locking mechanism hereinbefore explained. While using the auxiliary brake system either as an emergency replacement for the failing service brake system or as the vehicle parking brake, if, for any reasons, the brake wheel drum contracts, force 120 will greatly increase the compression stress upon spacer member 60 and this unbalance of forces more positively locks the locking mechanism provided by the interference fit engagement of rollers 84 and 85 with wedge 81 and the ramp 98. If spacer member 60 is rigid, this augmented interference fit becomes so strong that it becomes impossible to release the brake by the sole action of air pressure introduced into release chamber 80, and the brake actuator can be released only by way of a manual hammer applied to plunger 103. This latter cannot be done while the vehicle is moving, or should the plunger corrode in place.

Under very adverse condition, release by means of plunger 103 may thus even become impossible or may damage the brake actuator unit.

In the invention the spacer member 60 is of such characteristic as to limit to a predetermined value the load feed back from the brake actuating mechanism to the locking portion of the brake actuator. By so limiting the load imposed upon the locking portion of the actuator, the latter may be unlocked, i.e. the interference fit between the rollers 84 and 85 and the associated wedge surfaces 82 and 83 of the wedge rod 66 and ramp surfaces 96 and 97 may be broken, by introduction of normal pressure from the auxiliary reservoir into release chamber 80, as hereinbefore explained.

A spacer member 60 such as shown in FIGURES 1, 3 and 5, even if made of metal as shown at 60a in FIG. 1A, possesses by virtue of its construction a predetermined elastic deformation and recovery characteristics resulting from the combination of the relatively thin body portion 62 with the thicker more rigid annular peripheral portion 61 opposite the relatively rigid abutment plate 48. The brake drum feed back force, represented by arrow 120, is communicated by plate 48 to peripheral portion 61 of spaced member 60 and the relatively thin central body portion of the spacer is held fixed by the locking means, and as a result the spacer member tends to flex or be elastically deformed at the center of the body in the axial direction.

The amount of permissible deformation of the spacer member before permanent deformation takes place is dependent upon the material, the heat treatment thereof, the relative dimensions of the peripheral and central body portions thereof, the angularity of the frusto-conical surface 63, and other physical characteristics including shape.

Spacer member 60 is preferably made of a non-metallic elastomeric material having a high module of elasticity, and low hysteresis resulting in substantially complete and repetitive recovery to original shape when the load is removed. This material may be rubber, suitable synthetic resins or the like.

Several other spacer members according to the invention, wholly or partially made of resilient material, are illustrated in FIGURES 6–20.

FIGURES 6–8 show a spacer member having a disklike body 200 provided with a central opening 202 for passage therethrough of wedge rod 66 of FIGURE 1, assembly of the wedge rod, spacer member and diaphragm being shown in FIGURE 8. Opening 202 has an enlarged counterbore 204 for enclosing washer 71' and the nut 71 mounting the spacer member upon diaphragm on the end of the wedge rod as in FIGURE 1. Spacer member 200 has one side surface 206 in flat full surface engagement with diaphragm 39. The other side has a surface 208 usually constantly engaging diaphragm 38 on the opposite side from abutment plate 48, as shown in FIGURE 8. Disposed with their centers on a circle between the outer edge of surfaces 208 and counterbore 204 are a plurality of equally spaced cavities 210 of the same size open to the surface 208. Surfaces 206 and 208 of the spacer member define with the substantially right cylindrical side surface 212 thereof a substantially thick integral disk-like member. When member 200 is subjected to force such as indicated at 120 in FIGURE 8 resulting from the load fed back from the brake applying mechanism directed in one direction and the reactive force indicated at 122 due to the locked wedge rod, it is compressed to decrease ineffective thickness, with the cylindrical side surface 212 tending to bulge outwardly, as shown exaggeratedly in FIGURE 8. The side walls of counterbore 204 and cavities 210 also tend to bulge in a similar manner.

Even though the elastomeric material constituting the body 200 is per se substantially uncompressible it deforms under compression with the material being displaced partially filling the available space provided by counterbore and cavities. When the compression loads applied to faces 206 and 208 are removed, spacer member 200 very quickly recovers substantially its original shape and dimensions of FIGURE 7. For example, it has been found that a spacer member 200 of FIGURES 6–8 according to the invention having a given diameter and a no-load thickness of about 0.985 inch compressed by a load of 1200 pounds is reduced to a thickness of about 0.885 inch after the load was removed, and had returned to the original 0.985 inch twenty-five minutes later.

The foregoing described resilient spacer member according to the invention thus prevents undue stresses from being applied to the components of the brake actuator when contraction of the brake drum due to cooling increases the fed back force applied to the side of the spacer member engaging the auxiliary diaphragm 38 and abutment plate 48.

Furthermore, a resilient spacer according to the invention allows more precise modulation of the auxiliary brake system and enables the vehicle operator to release the auxiliary and parking brake by introduction of air at normal service or auxiliary pressures in the release chamber of the actuator. Even if the actuator becomes locked in the parking brake mode as a result of the contraction of the brake drum while the vehicle is stationary, piston 74 may nevertheless be displaced to the left in FIGURE 2 by plunger 103 without any undue stress being imposed upon the components of the actuator unit. When piston 74 is thus displaced to the left, cage 86 exerts an axial force on wedge rod 66 which may be displaced to the left as a result of the compressibility of the spacer member until the locking wedge action is broken and the parts returned to FIGURE 1 condition.

FIGURES 9 and 10 show another embodiment of spacer member comprising a disk-shaped elastomer body 220 having on one side a circular substantially flat surface 222 for engagement with an auxiliary diaphragm 38. On the other side is an annular flat surface 224 for engaging the auxiliary diaphragm 39. Surface 224 surrounds a central recess 226 and is coaxial with a wedge rod receiving bore 228. A plurality of regularly disposed cavities 230 are formed in a circular row in the annular face 224 to increase the overall compressibility of the spacer member.

Spacer member 240 of FIGURES 11 and 12 comprises an elastomer body 240, substantially disk-shaped and having a circular flat surface 242 on one side and an annular peripheral surface 244 on the other side surrounding a recess 246 coaxial with a central wedge rod mounting bore 248. Annular surface 244 is connected to the bottom surface of recess 246 by a frusto-conical surface 250, and another peripherally disposed frusto-conical surface 252 joins the cylindrical side surface 254 of the spacer member to the annular surface.

Spacer member 260 of FIGURES 13 and 14 is a disclike elastomeric body having a flat surface 262 on one side and on the other side an annular peripherally projecting face 264 substantially half toroidal and surrounding a recess 266. Member 260 has a centrally disposed wedge rod mounting bore 268. In this embodiment, the annular half toroidal surfave 264 presents a circular line engagement with the corresponding surface of service diaphragm 38 which tends to thicken and become an annular surface engagement of a width progressively increasing with the load applied upon the spacer member.

FIGURES 15 and 16 show a disk-shaped elastomeric spacer member 270 having a planar surface 272 on one side and on the other side two projecting concentric annular co-planar surfaces 274 and 276 separated by an annular concave groove 278 and disposed on the end of an annular integral peripheral projection 280 surrounding central recess 282. A wedge rod mounting bore 284 is provided coaxially of recess 282.

FIGURES 17 and 18 show a composite spacer member comprising a flat sided disk-like metal body 290 at the periphery of which on one side is permanently bonded an annular elastomeric block 292. Annular flat surface 294 of block 292 is adapted to engage the service diaphragm in the assembly, and body 290 is formed with a central mounting hole 296 for the wedge rod. The interior of block 292 provides a nut enclosing recess 291 like that of spacer 60.

FIGURES 19 and 20 show a composite spacer member similar to FIGURES 17 and 18 in that an annular elastomeric block 298 is permanently bonded upon one side of the flat sided metal disk 290 so as to surround a recess 299. In FIGURES 19 and 20 however the annular wall 301 of recess 299 is tapered rearwardly toward disc 290. Alternatively the outer periphery of block 298 may be tapered.

In all of the spacer members shown in FIGURES 6 to 20 an annular peripheral surface is provided on the side engaging the diaphragm, this surface being in force opposed relation to abutment plate 48 on the other side of the service diaphragm. This annular surface surrounds a central recess that encloses the nut 74 on the wedge rod. All of these spacer members are essentially peripherally rigid and centrally flexible so that they operate in the assembly like spacer 60. Any of the spacers of FIGURES 6 to 20 may be formed with seal increasing ridges like ridges 64 of spacer 60 in the flat auxiliary diaphragm side.

FIGURE 21 is a view showing parts in the unlocked position of FIGURE 1, with corresponding parts similarly numbered.

Here the wedge rod 66 is formed at its end opposite the wedge with a reduced threaded section 302 for mounting a nut-like member 303 that a crimped over flange 304 retaining a rubber or like bumper button 305 adapted to abut service diaphragm 38.

A disc-like spacer member 306 comprises an integral elastomeric body having a relatively thin wall 307 at the bottom of a recess 308 surrounded by a projecting peripheral rib 309 having a flat annular end surface 311 engaging diaphragm 38 opposite the periphery of abutment block 48.

Spacer member 306 has a flat surface 312 in full surface engagement with one side of auxiliary diaphragm 39. A hollow fastener 313 has an enlarged head 314 engaging the other side of diaphragm 39 and a shank 315 projecting through an aperture in the diaphragm to terminate in a threaded end 316 on which is mounted a sheet metal nut 317. A washer 318 is interposed between the nut and the bottom of recess 308, and when nut 317 is drawn tight spacer 306 is fixed to the center of diaphragm 39. Then when threaded member 303 is tightened on the end of the wedge rod its inner end tightly engages the adjacent end of fastener 313, so that the wedge rod is also fixed to diaphragm 39.

FIGURE 21 shows the parts in unlocked position, with the brake mechanism actuator return spring (not shown) forcing rod 47 to the right whereby abutment 48 is peripherally opposite spacer rib 309 and centrally opposite button 305. In this embodiment the resilient button 305 absorbs some of the compressive forces acting on the spacer, and excessive flexing of the spacer is prevented.

What is claimed and desired to be secured by Letters Patent is:

1. An actuator assembly for a vehicle brake mechanism of the type wherein a reciprocable wedge-type actuator is operably connected to opposed brake shoe ends comprising a housing, two fluid pressures responsive elements disposed in tandem within said housing and defining a service fluid pressure chamber between said elements and an auxiliary fluid pressure chamber between a first of said elements and the housing, axially rigid means operably connected between the second element and a wedge-type actuator, a motion transmitting and excess stress absorbing member within said service chamber extending between said elements, said elements being displaceable together in the same direction to act through said axially rigid means for moving a wedge-type actuator in that direction for applying the brake mechanism, positive locking means responsive only to brake application resulting from introduction of fluid under pressure into said auxiliary fluid pressure chamber and operably connected to said first element for preventing return movement of both of said elements in the brake release direction, said member being sufficiently rigid to transmit brake applying forces when said elements are displaced in the brake applying direction but being sufficiently axially yieldable to permit compensating relative displacement of said elements toward each other when subjected to excessive compressive stress arising from opposed relative forces of said locking means and axially rigid means.

2. In the actuator assembly defined in claim 1, said member being secured to one of said elements so as to be movable therewith.

3. In the actuator assembly defined in claim 1, said member serving as a spacer to contribute to defining said service fluid pressure chamber between said elements.

4. In the actuator assembly defined in claim 1, said member being formed with a cavity disposed within its peripheral confines and into which said member displaces when subjected to compression.

5. In the actuator assembly defined in claim 1, said member being a substantially cup-shaped annulus with its inner and outer peripheries engaging the respective pressure responsive elements.

6. In the actuator assembly defined in claim 1, said member being substantially cup-shaped with a body portion secured to one of said elements and an annular rim portion abutting the other of said elements.

7. In the actuator assembly defined in claim 1, said locking means being directly connected to the first fluid pressure responsive element.

8. In the actuator assembly defined in claim 1, said member being resilient.

9. In the actuator assembly defined in claim 1, said member being an integral preformed body of resilient material such as rubber or synthetic plastic.

10. In the actuator assembly defined in claim 1, said member being metal.

11. In the actuator assembly defined in claim 1, said member being a bonded unit consisting of metal and resilient nonmetallic material.

12. In the actuator assembly defined in claim 1, said member comprising a centrally flexible portion attached to said first pressure responsive element and an axially projecting peripheral portion separably engaging said other pressure responsive element.

13. In the actuator assembly defined in claim 1, said member having one axial side secured to said first pressure responsive element and the other axial side adapted to separably contact said second pressure responsive element and being so formed as to deformably flex under said excess compressive stress.

14. In the actuator assembly defined in claim 13, said member having a central cavity on said other axial side, said locking means having a rod projecting through said first pressure responsive element into said cavity, fastening means for securing the central area of said member in axially tight rigid relation to the center of said first element and said rod while permitting said flexure of said other axial side of said member.

15. In the actuator assembly defined in claim 1, said member being a disk-like member having an axially facing surface secured to one of said elements and a peripherally projecting deformable rim portion adapted to engage the other of said elements.

16. In the actuator assembly defined in claim 1, said member having a body formed with a large area surface on one side flush with said first element and a flexible outer rim projecting from the other side into contact with said second element, said rim surrounding a cavity, and said locking means comprising an axially rigid device projecting through said first element into said cavity, fastening means in said cavity securing said member, first element and locking device in tight assembly.

References Cited

UNITED STATES PATENTS 3,322,241   5/1967   Cox et al. _____ 188—170

MARTIN P. SCHWADRON, Primary Examiner
IRWIN C. COHEN, Assistant Examiner

U.S. Cl. X.R.

92—24, 62, 64; 188—106; 303—9